Figure 1:
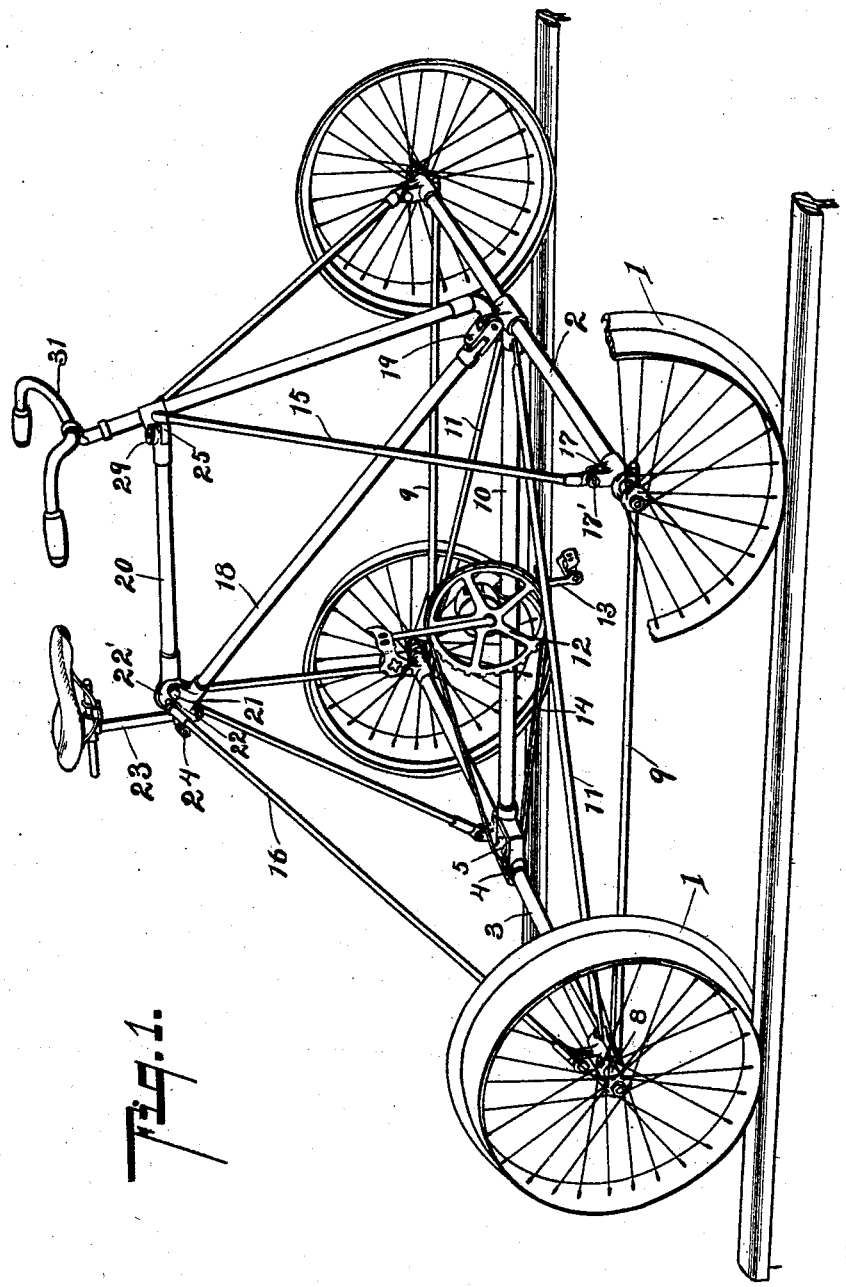

C. C. CLEVERDON.
VELOCIPEDE.
APPLICATION FILED JUNE 15, 1908.

907,743.

Patented Dec. 29, 1908.
3 SHEETS—SHEET 1.

Witnesses
Lulu Grunfield
Phina Woodruff

Inventor
Carl C. Cleverdon
By Chappell & Earl
Attorneys

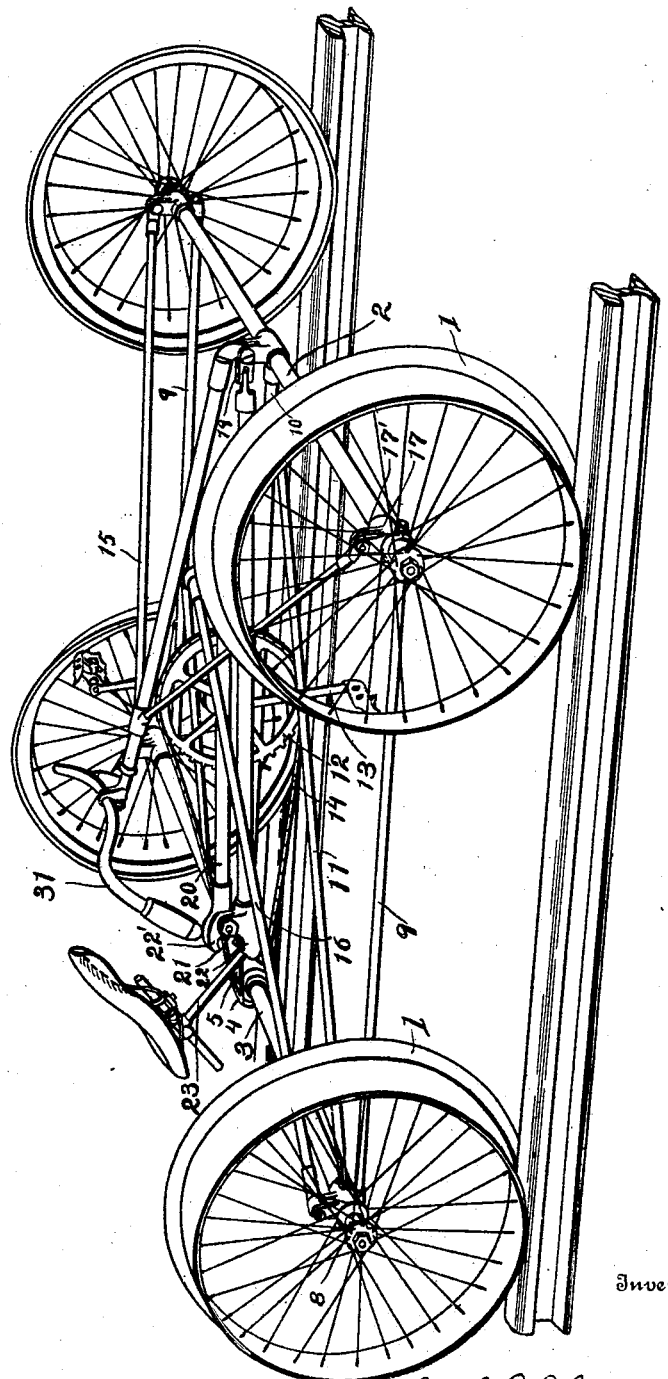

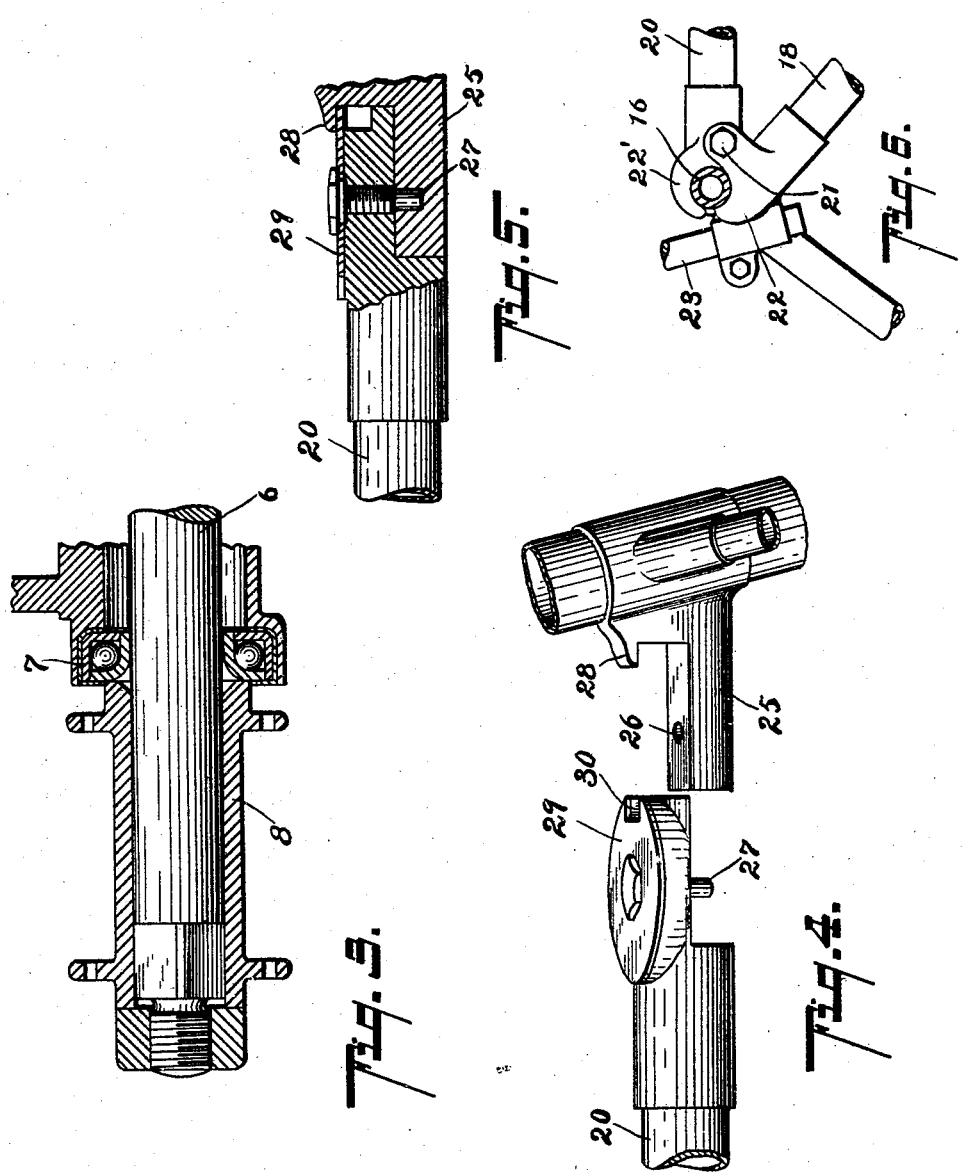

UNITED STATES PATENT OFFICE.

CARL C. CLEVERDON, OF GRAND RAPIDS, MICHIGAN, ASSIGNOR TO THE SHEFFIELD CAR COMPANY, OF THREE RIVERS, MICHIGAN.

VELOCIPEDE.

No. 907,743.  Specification of Letters Patent.  Patented Dec. 29, 1908.

Application filed June 15, 1908. Serial No. 438,642.

*To all whom it may concern:*

Be it known that I, CARL C. CLEVERDON, a citizen of the United States, residing at the city of Grand Rapids, county of Kent, State of Michigan, have invented certain new and useful Improvements in Velocipedes, of which the following is a specification.

This invention relates to improvements in velocipedes.

The main objects of this invention are: First, to provide an improved velocipede which is of light construction, and, at the same time, one which is very strong and rigid. Second, to provide an improved velocipede, the frame of which can be effectively collapsed or knocked down for the purpose of storage or transportation. Third, to provide an improved velocipede which is economical in structure, and, at the same time, very desirable, and one which can be knocked down or set up without the use of tools.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a perspective view of my improved velocipede erected. Fig. 2 is a similar view of my improved velocipede knocked down or collapsed. Fig. 3 is an enlarged longitudinal section through the wheel hub, showing the arrangement of the wheel, axle and bearing therefor. Fig. 4 is an enlarged detail showing the coupling for the cross bar 20 to one of the seat supporting frames disconnected. Fig. 5 is an enlarged detail, partially in section, of the coupling in its coupled position. Fig. 6 is an enlarged detail showing details of the connection for the brace 18 and crossbar 20 to the rear seat supporting frame.

In the drawing, similar numerals of reference refer to similar parts throughout the several views.

Referring to the drawing, the wheels 1 may be of any desired construction. I provide a running-gear frame comprising front and rear axle tubes 2 and 3, the rear axle tube having a yoke 4 interposed therein to receive the sprocket 5 which is secured to the axle. The axles 6 are arranged through these axle tubes and are provided with suitable ball bearings 7, the hubs 8 of the wheels, in the structure illustrated, being rigidly secured or fixed to the axle. The axle tubes are connected by horizontal bars 9, 9 and 10, the bars 9 being the side bars and the bar 10 being the central bar, which is preferably secured to the yoke 4 of the rear axle tube. This frame is made rigid and is preferably provided with diagonally-arranged braces 11. I thus secure a running-gear frame which is rigid and at the same time very light.

The crank 13 for the driving sprocket 12 is mounted in a suitable bearing carried by the central bar 10, the crank being of the usual or any desired construction. The sprocket 12 is connected to the axle sprocket 5 by means of a suitable chain, as 14. It will be noted that the driving mechanism is entirely carried by the running-gear frame. The collapsible seat support comprises front and rear frames 15 and 16, respectively, which are mounted on the axle tubes, the axle tubes being preferably provided with upwardly-projecting hinge member 17, in which the lower ends of the members forming the front and rear seat supporting frames are secured by pivot bolts 17'. These pivots are preferably in the form of bolts, so that the seat supporting frame can be readily removed, when desired. These front and rear seat supporting frames are preferably made up of three members arranged to form a triangular frame, the axle tubes forming the bases of the triangles. To connect and brace these seat supporting frames, I provide a diagonally-arranged brace 18 which is connected at its lower end to the front axle tube, preferably by means of the universal joint 19, the object of the universal joint being to allow the brace to be swung to one side, when the structure is collapsed out of the way of the sprocket wheels and cranks,—see Fig. 2.

The cross bar 20 is connected to the brace bar 18 by means of a pivot 21 so as to be folded down thereon when the structure is collapsed. I preferably provide the brace member 18 and the cross bar 20 with jaw members 22 and 22', respectively, which are adapted to coact for engaging the rear seat support frame, when the structure is erected, forming thereby an effective detachable connection. The details of this connection will clearly appear from Fig. 6. The seat is preferably mounted on the the rear end of the brace bar 18, the post 23 of the seat being adjustably secured in a suitable socket provided therefor by means of the bolt 24. When the brace bar 18 is disconnected from the frame 16, it may be swung down onto the running-gear frame and the frame 16 swung forward thereon. The cross bar 20 is detachably connected to the front seat support frame 15, preferably by the coupling illustrated in Figs. 4 and 5, which consists of the coupling member 25 having a hole 26 therein, adapted to receive the pin 27 on the cross bar when the parts are coupled together, as illustrated in Fig. 5. Above the coupling member 25 is a keeper 28 for the locking disk 29. This locking disk is notched at 30 to receive the keeper, and, after the parts are in position, the locking disk is turned to take the notch out of register with the keeper which effectively locks them in position. By thus arranging and connecting the parts, it will be obvious that they can be readily collapsed or erected. When it is desired to collapse the structure, the parts being secured as illustrated in Fig. 1, the locking disk 29 is turned to bring the notch 30 therein into register with the keeper and the cross bar lifted from the coupling 25. The cross bar 20 is then dropped down, which releases the jaws 22 and 22' from the rear seat supporting frame, allowing the bar 18 to drop downwardly onto the running-gear frame. As stated, the universal joint permits its being swung to one side to avoid the sprocket wheel and crank. The rear seat frame is then swung forward and the front seat frame 15 is swung rearwardly, the parts being collapsed into a compact form, as shown in Fig. 2. It will be obvious that the structure may also be erected very quickly.

The handle bars 31 are carried by the front seat supporting frame. These handle bars are not intended, in the structure illustrated, for steering purposes, but are designed merely as a support or rest for the rider. It will be observed that this erecting or collapsing of the structure does not, in any way, affect or change the position of the driving mechanism, which is always securely mounted in position on the running-gear frame. This is of advantage in that it does not get it out of adjustment.

By the construction and arrangement of the frame and braces, triangles are made use of, which, as is well known, are the only rigid or self-supporting form of polygon. The parts are so connected and arranged that it is unnecessary to provide any bent tubing in the construction which enables the use of hard drawn tubing which is not weakened by bending. The bearings for the wheels are also of a desirable form, as the axles are of full size where they enter and are secured to the hub, so that they are not likely to be bent in use.

I have illustrated and described my improved velocipede in detail in the form preferred by me on account of structural simplicity and economy and convenience in collapsing and erecting. I am aware, however, that it is capable of considerable variation in structural details without departing from my invention, and I desire to be understood as claiming the same specifically, as illustrated, as well as broadly.

Having thus described my invention, what I claim as new and desire to secure by Letters Patent is:

1. The combination with the wheels, of axles; a running-gear frame comprising front and rear axle tubes; a plurality of horizontally-arranged connecting bars for said axle tubes whereby they are rigidly connected, one of said bars being centrally arranged; a sprocket wheel and cranks mounted on said central bar; a sprocket wheel for the rear axle; a connecting chain for said sprockets; a seat support comprising front and rear frames pivotally mounted on said axle tubes; a diagonal brace bar pivotally connected to the front axle tube; a cross bar pivoted on said brace bar; and means for detachably connecting the rear ends of said brace and cross bars to the rear frame and the forward end of said cross bar to the front frame.

2. The combination with the wheels, of axles; a running-gear frame comprising front and rear axle tubes; a plurality of horizontally-arranged connecting bars for said axle tubes whereby they are rigidly connected; a seat support comprising front and rear frames pivotally mounted on said axle tubes; a diagonal brace bar pivotally connected to the front axle tube; a cross bar pivoted on said brace bar; and means for detachably connecting the rear ends of said brace and cross bars to the rear frame and the forward end of said cross bar to the front frame.

3. The combination with the wheels, of axles; a running-gear frame comprising front and rear axle tubes; a plurality of horizontally-arranged connecting bars for said axle tubes whereby they are rigidly connected, one of said bars being centrally arranged; a sprocket wheel and cranks mounted on said central bar; a sprocket wheel for the rear axle; a connecting chain for said sprockets; a seat support comprising front and rear frames pivotally mounted on said axle tubes; a diagonal brace bar connected to the front axle tube; a cross bar; and means for detachably connecting the rear ends of said brace and cross bars to the rear frame and the forward end of said cross bar to the front frame.

4. The combination with the wheels, of axles; a running-gear frame comprising front and rear axle tubes; a plurality of horizontally-arranged connecting bars for said axle tubes whereby they are rigidly connected; a seat support comprising front and rear frames pivotally mounted on said axle tubes; a diagonal brace bar connected to the front axle tube; a cross bar; and means for detachably connecting the rear ends of said brace and cross bars to the rear frame and the forward end of said cross bar to the front frame.

5. The combination with the running-gear frame, of a seat support comprising front and rear frames pivotally mounted on said running-gear frame; a diagonal brace bar pivotally connected at its lower end to the front of the running-gear frame by a universal joint; a seat mounted on said brace bar; a cross bar pivoted on said brace bar and adapted, when in its elevated position, to coact therewith in engaging the rear frame; means for detachably connecting the forward end of said cross bar to the front frame; and a handle bar mounted on said front frame.

6. The combination with the running-gear frame, of a seat support comprising front and rear frames pivotally mounted on said running-gear frame; a diagonal brace bar connected at its lower end to the front of the running-gear frame; a seat mounted on said brace bar; a cross bar pivoted on said brace bar and adapted, when in its elevated position, to coact therewith in engaging the rear frame; means for detachably connecting the forward end of said cross bar to the front frame; and a handle bar mounted on said front frame.

7. The combination with the running-gear frame, of a seat support comprising front and rear frames pivotally mounted on said running-gear frame; a diagonal brace bar pivotally connected at its lower end to the front of the running-gear frame by a universal joint; a seat mounted on said brace bar; a cross bar pivoted on said brace bar; means for detachably connecting the upper end of said brace bar to said rear frame and the forward end of said cross bar to the front frame; and a handle bar mounted on said front frame.

8. The combination with the running-gear frame, of a seat support comprising front and rear frames pivotally mounted on said running-gear frame; a diagonal brace bar connected it its lower end to the front of the running-gear frame; a seat mounted on said brace bar; a cross bar pivoted on said brace bar; means for detachably connecting the upper end of said brace bar to said rear frame and the forward end of said cross bar to the front frame; and a handle bar mounted on said front frame.

9. The combination with the running-gear frame, of a seat support comprising front and rear frames pivotally mounted on said running-gear frame; a diagonal bar pivotally connected at its lower end to the running-gear frame by a universal joint; a cross bar pivoted on said brace bar; and means for detachably connecting the upper end of said brace bar to one frame and the swinging end of said cross bar to the other frame.

10. The combination with the running-gear frame, of a seat support comprising front and rear frames pivotally mounted on said running-gear frame; a diagonal brace bar connected at its lower end to the running-gear frame; a cross bar pivoted on said brace bar; and means for detachably connecting the upper end of said brace bar to one frame and the swinging end of said cross bar to the other frame.

11. The combination with the running-gear frame, of a seat support comprising front and rear frames pivotally mounted on said running-gear frame; a diagonal brace bar pivotally connected at its lower end to the front of the running-gear frame; a cross bar pivoted on said brace bar, said brace and cross bars having jaws thereon adapted to engage and connect the same to the rear seat frame when in their erected position; means for detachably securing said cross bar to the front seat frame; and a seat carried by said diagonal brace bar.

12. The combination with the running-gear frame, of a seat support comprising front and rear frames pivotally mounted on said running-gear frame; a diagonal brace bar pivotally connected at its lower end to the front of the running-gear frame; a cross bar pivoted on said brace bar, said brace and cross bars having jaws thereon adapted to engage and connect the same to the rear seat frame when in their erected position; and means for detachably securing said cross bar to the front seat frame.

13. The combination with the running-gear frame, of a seat support comprising front and rear frames pivotally mounted on said running-gear frame; a diagonal brace bar pivotally connected at its lower end to the running-gear frame; a cross bar pivoted on said brace bar, said brace and cross bars having jaws thereon adapted to engage and connect the same to one of said seat frames when in their erected position; and means for detachably securing said cross bar to the other of said seat frames.

14. The combination with the running-gear frame, of a seat support comprising front and rear frames pivotally mounted on said running-gear frame; a diagonal brace pivotally connected at its lower end to the running-gear frame and detachably connected at its upper end to one of said seat frames; and a cross bar detachably connected to said front and rear seat frames.

15. The combination with the running-gear frame comprising front and rear axle tubes; upwardly-projecting hinge members on said axle tubes; a seat support comprising triangular front and rear frames pivotally secured to said hinge members by removable pintles, whereby they may be folded down upon the running-gear frame or removed therefrom; a diagonal brace bar pivotally connected to the front axle tube by a universal joint; a cross bar pivotally mounted on the rear end of said diagonal bar and adapted to fold down thereon; and means for detachably connecting said cross bar to the front frame whereby the seat support may be collapsed on the running-gear frame, and, when erected said diagonal bar forms a triangle with the rear seat support frame and running-gear frame and with the said front seat support frame and said cross bar.

16. The combination with the running-gear frame, of a seat support comprising triangular front and rear frames pivotally secured to said running-gear frame; a diagonal brace bar pivotally connected to the running-gear frame; a cross bar pivotally mounted on the rear end of said diagonal bar and adapted to fold down thereon; and means for detachably connecting said cross bar to the front frame whereby the seat support may be collapsed on the running-gear frame, and, when erected, said diagonal bar forms a triangle with the rear seat support frame and running-gear frame and with the said front seat support frame and said cross bar.

17. The combination with the running-gear frame, of a seat support comprising triangular front and rear frames pivotally mounted on said running-gear frame, whereby they may be folded down thereon one upon the other; a diagonal brace bar pivotally connected to the running-gear frame and detachably connected to one of said seat support frames; and a cross bar detachably connected to said seat support frames, whereby, when the seat support is erected, said diagonal bar forms a triangle with one of said seat support frames and the running-gear frame and with the other of said seat support frames and with said cross bar.

18. The combination with the running-gear frame, of a seat support comprising triangular front and rear frames mounted on said running-gear frame; a diagonal brace bar connected to the running-gear frame and to one of said seat support frames; and a cross bar connected to said seat support frames, whereby said diagonal bar forms a triangle with one of said seat support frames and the running-gear frame and with the other of said seat support frames and with said cross bar.

19. The combination with the running-gear frame, of a seat support comprising front and rear frames pivotally mounted on said running-gear frame; a diagonal brace bar pivoted at its lower end to said running-gear frame; a cross bar pivoted on said brace bar adapted to coact therewith in engaging one of the seat frames, said cross bar being provided with a downwardly-projecting pin at its swinging end; a coupling member on the other seat frame adapted to receive the end of said cross bar and having a hole therein to receive the said pin on said cross bar; a keeper on said coupling member, the end of said cross bar being notched to receive said keeper; and a notched locking disk on said cross bar adapted to be adjusted to bring the notch therein into or out of register with said keeper.

20. The combination with the running-gear frame, of a seat support comprising front and rear frames pivotally mounted on said running-gear frame; a cross bar provided with a downwardly-projecting pin at one end; a coupling member on one of said seat frames adapted to receive the end of said cross bar and having a hole therein to receive the said pin on said cross bar; a keeper on said coupling member, the end of said cross bar being notched to receive said keeper; and a notched locking disk on said cross bar adapted to be adjusted to bring the notch therein into or out of register with said keeper.

21. The combination with the running-gear frame, of a seat support frame formed of detachably connected members pivotally mounted on said running-gear frame, the members of said seat support frame being arranged on their pivot to be swung down to fold said seat supporting frame upon the running-gear frame.

22. The combination with the running-gear frame, of a seat support frame consisting of members pivotally mounted on said running-gear frame, the members of said seat support frame being adapted to be swung down on their pivots upon the running gear frame.

In witness whereof, I have hereunto set my hand and seal in the presence of two witnesses.

CARL C. CLEVERDON. [L. S.]

Witnesses:
EARL STOKOE,
ELLA DE VRIES.